US012757237B2

(12) United States Patent
Gandhi et al.

(10) Patent No.: US 12,757,237 B2
(45) Date of Patent: Oct. 6, 2026

(54) MAPC WITH TID-SPECIFIC MLD AWARENESS

(71) Applicant: Cisco Technology, Inc., San Jose, CA (US)

(72) Inventors: Indermeet Gandhi, San Jose, CA (US); Malcolm Smith, Richardson, TX (US); Robert Barton, Vancouver (CA); Pooya Monajemi, Milpitas, CA (US); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 367 days.

(21) Appl. No.: 18/536,066

(22) Filed: Dec. 11, 2023

(65) Prior Publication Data

US 2025/0193914 A1 Jun. 12, 2025

(51) Int. Cl.
*H04W 72/50* (2023.01)

(52) U.S. Cl.
CPC .................................. *H04W 72/535* (2023.01)

(58) Field of Classification Search
CPC . H04W 84/12; H04W 72/0446; H04W 88/08; H04W 74/002; H04W 72/535;
(Continued)

(56) References Cited

U.S. PATENT DOCUMENTS 11,792,829 B2 * 10/2023 Chu ...................... H04W 72/51 370/311
2019/0075583 A1 3/2019 Park et al.
(Continued)

FOREIGN PATENT DOCUMENTS

EP 3641458 B1 * 5/2024 ............ H04W 16/10

OTHER PUBLICATIONS

D. Nunez, M. Smith and B. Bellalta, discloses "Multi-AP Coordinated Spatial Reuse for Wi-Fi 8: Group Creation and Scheduling," 2023 21st Mediterranean Communication and Computer Networking Conference (MedComNet), Island of Ponza, Italy, 2023, (Jun. 13, 2023) pp. 203-208, (Year: 2023).*
(Continued)

*Primary Examiner* — Olumide Ajibade Akonai
(74) *Attorney, Agent, or Firm* — Rutan & Tucker, LLP; Ravi Mohan; Marc A. McClain

(57) ABSTRACT

Described herein are devices, systems, methods, and processes for coordinating transmission opportunities (TXOPs) in a wireless network with multi-access point coordination (MAPC) and multi-link device (MLD) features. An MAPC coordinator in the network may coordinate TXOPs for multiple network devices in a coordination group. Some of these network devices can utilize multi-link operation (MLO), establishing multiple simultaneous links with client devices over the same or different frequency bands. The MAPC coordinator may receive data about the MLD status and buffer status of each basic service set (BSS) and/or each network device in the network. The MAPC coordinator can also receive data about the buffer status of client devices. Based on the data, the MAPC coordinator may make decisions about which MLD links are likely to be utilized and their associated TXOPs, optimizing network performance and efficiency.

18 Claims, 8 Drawing Sheets

(58) Field of Classification Search
CPC ............. H04W 28/0278; H04W 74/04; H04W 74/0866; H04W 72/23; H04W 52/0216; H04W 72/27; H04W 28/26; H04W 72/12; H04W 84/18; H04W 92/20; H04W 16/10; H04W 24/02; H04W 28/16; H04W 16/06; H04L 5/0035; H04L 5/0037
See application file for complete search history.

(56) References Cited

U.S. PATENT DOCUMENTS

| | | | | |
|---|---|---|---|---|
| 2020/0120544 | A1* | 4/2020 | Liu | H04W 28/26 |
| 2020/0359259 | A1* | 11/2020 | Patil | H04W 88/08 |
| 2022/0174691 | A1 | 6/2022 | Xia et al. | |
| 2022/0400500 | A1 | 12/2022 | Xia et al. | |
| 2023/0048964 | A1 | 2/2023 | Seok et al. | |
| 2023/0117842 | A1* | 4/2023 | Xin | H04W 28/0268 370/235 |
| 2023/0120236 | A1* | 4/2023 | Jang | H04W 74/0816 370/329 |
| 2023/0262805 | A1 | 8/2023 | Kneckt et al. | |
| 2023/0389101 | A1* | 11/2023 | Hong | H04W 48/16 |
| 2024/0098712 | A1* | 3/2024 | Chitrakar | H04L 5/0035 |
| 2024/0137974 | A1* | 4/2024 | Sugaya | H04W 74/02 |

OTHER PUBLICATIONS

Lopez-Raventos A., et al., "Multi-link Operation in IEEE 802.11be WLANs", arXiv:2201.07499v1, Jan. 19, 2022, pp. 1-7.

Fang (ZTE TX)Y., et al., "Multi-link and Multi-AP Reference Model Discussion", IEEE Draft, 11-20-0068-00-00BE-Multi-Link-And-Multi-AP-Reference-Model-Discussion, IEEE-SA Mentor, Piscataway, NJ USA, vol. 802.11 EHT, 802.11be, Jan. 11, 2020, pp. 1-14, XP068165083, Retrieved from https://mentor.ieee.org/802.11/dcn/20/11-20-0068-00-00be-multi-link-and-multi-ap-reference-model-discussion.pptx on Jan. 11, 2020, p. 2-p. 7 p. 10.

International Search Report and Written Opinion for International Application No. PCT/US2024/058723, mailed Feb. 14, 2025, 13 Pages.

Yee (Mediatek) J., et al., "Multi AP Coordination for UHR", IEEE Draft, 11-22-1512-00-0UHR-MULTI-AP-Coordination-for-UHR, IEEE-SA Mentor, Piscataway, NJ USA, vol. 802.11 UHR, Sep. 14, 2022, pp. 1-17, XP068193976, Retrieved from https://mentor.ieee.org/802.11/dcn/22/11-22-1512-00-0uhr or-uhr.pptx on Sep. 14, 2022, p. 4, p. 7-p. 9, p. 11, p. 13.

Zhang (Ofinno) J., et al., "Multi-Link based Multi-AP Coordination for Low-Latency Traffic", IEEE Draft, 11-23-1981-00-00BN-Multi-Link-Based-Multiap-Coordination-for-Low-Latency-Traffic, IEEE-SA Mentor, Piscataway, NJ USA, vol. 802.11 UHR, 802.11bn, Nov. 13, 2023, pp. 1-8, XP068207073, Retrieved from https://mentor.ieee.org/802.11/dcn/23/11-23-1981-00-00bn-multi-link-based-multiap-coordination-for-low-latency-traffic.pptx on Nov. 13, 2023, p. 2-p. 3, p. 5-p. 6.

Zhou (TCL) P., et al., "Buffer Status Report in Multi-AP", IEEE 802.11-23/1844r0, Nov. 27, 2023, pp. 1-10, XP093246627, Retrieved from https://mentor.ieee.org/802.11/dcn/23/11-23-1844-00-00bn-bsr-in-multi-ap.pptx, p. 2-p. 3, p. 5.

* cited by examiner

MAPC WITH TID-SPECIFIC MLD AWARENESS

The present disclosure relates to wireless communication. More particularly, the present disclosure relates to coordinating transmission opportunities (TXOPs) in a multi-access point (AP) network with multi-link device (MLD) features.

BACKGROUND

Wireless networks have become ubiquitous, providing connectivity for a myriad of devices ranging from smartphones and laptops to smart home devices and industrial equipment. These networks typically operate using a set of access points (APs) that provide coverage over a certain area. Each AP is associated with at least one basic service set (BSS), which is a group of devices that communicate with each other within a defined network area. As the demand for wireless connectivity has grown, so has the number of devices connected to each AP, leading to increased network congestion and reduced performance.

To mitigate these issues, some networks have started to use multi-link operation (MLO), a feature that allows a device, referred to as a multi-link device (MLD), to establish and maintain multiple simultaneous links over the same or different frequency bands. This can be utilized for selection diversity, additive throughput, and latency reduction purposes. However, managing these multiple links can be a complex task.

In existing wireless network standards, MLD and multi-AP coordination (MAPC) are presented as separate capabilities. MAPC uses inter-BSS and inter-AP link connectivity awareness to schedule transmission opportunities (TXOPs) between APs with minimal interference. The combined use of MLD and MAPC presents certain challenges. By way of a non-limiting example, a TXOP seized by an AP in an MAPC group with the intent of serving a client device within its single channel BSS may no longer be usable if the client device or AP decides to serve the need on another link in association with MLO. This would mean using another BSS and coordination or co-channel group from a MAPC perspective during that same interval. This situation can lead to inefficiencies and complexities in the coordination of TXOPs in a wireless network with multiple APs and MLDs.

SUMMARY OF THE DISCLOSURE

Systems and methods for coordinating transmission opportunities (TXOPs) in a multi-access point (AP) network with multi-link device (MLD) features in accordance with embodiments of the disclosure are described herein. In some embodiments, a coordinator network device includes a processor, at least one network interface controller configured to provide access to a network, and a memory communicatively coupled to the processor, wherein the memory includes a coordination logic. The logic is configured to receive multi-link operation (MLO)-related data from each of one or more MLO-enabled network devices associated with a coordination group, the coordination group including a plurality of network devices, allocate a transmission opportunity (TXOP) to a first network device in the coordination group based at least in part on the MLO-related data, and transmit an indication of the allocation of the TXOP to the first network device.

In some embodiments, the coordination group includes a multi-access point (AP) coordination (MAPC) group.

In some embodiments, the MLO-related data from at least one of the one or more MLO-enabled network devices includes an indication of a number of radios for each of the at least one of the one or more MLO-enabled network devices.

In some embodiments, the TXOP is allocated to the first network device based at least in part on the number of radios for each of the at least one of the one or more MLO-enabled network devices.

In some embodiments, to allocate the TXOP to the first network device, the coordination logic is further configured to reduce a relative weight associated with a first MLO-enabled network device of the one or more MLO-enabled network devices in response to the first MLO-enabled network device having a greater than a threshold number of radios.

In some embodiments, the MLO-related data from at least one of the one or more MLO-enabled network devices includes an indication of one or more supported MLO modalities for one or more client devices associated with each of the at least one of the one or more MLO-enabled network devices.

In some embodiments, the one or more supported MLO modalities include one or more of simultaneous transmit and receive (STR), non-simultaneous transmit and receive (NSTR), or enhanced multi-link single-radio (eMLSR).

In some embodiments, the MLO-related data is received from at least one of the one or more MLO-enabled network devices based on the at least one of the one or more MLO-enabled network devices joining the coordination group.

In some embodiments, the TXOP is allocated to the first network device based at least further in part on a downlink buffer status associated with each network device of the plurality of network devices in the coordination group.

In some embodiments, the downlink buffer status includes a downlink queue depth associated with each traffic identifier (TID) and each basic service set (BSS) at the network device.

In some embodiments, the downlink queue depth corresponds to a number of medium access control (MAC) service data units (MSDUs).

In some embodiments, the coordination logic is further configured to balance or rebalance a priority of at least some of the plurality of network devices.

In some embodiments, the coordination logic is further configured to allocate a second TXOP to a client device associated with a second network device in the coordination group based at least in part on the MLO-related data and an aggregate uplink buffer status associated with each network device of the plurality of network devices in the coordination group, and transmit an indication of the allocation of the second TXOP to the second network device.

In some embodiments, the aggregate uplink buffer status is based on a buffer status report (BSR) from each client device associated with the network device.

In some embodiments, the BSR includes an uplink queue depth associated with each traffic identifier (TID) and each basic service set (BSS) at the client device.

In some embodiments, the uplink queue depth corresponds to a number of medium access control (MAC) service data units (MSDUs).

In some embodiments, the MSDUs include one or more committed MSDUs.

In some embodiments, the allocation of the second TXOP is associated with a resource unit (RU) assignment.

In some embodiments, a network device includes a processor, at least one network interface controller configured to provide access to a network, and a memory communicatively coupled to the processor, wherein the memory includes a coordination logic. The logic is configured to transmit multi-link operation (MLO)-related data associated with the network device to a coordinator network device associated with a coordination group, the coordination group including a plurality of network devices, the plurality of network devices including the network device, receive an indication of an allocation of a transmission opportunity (TXOP) from the coordinator network device based at least in part on the MLO-related data, and send a downlink transmission based on the allocation of the TXOP.

In some embodiments, a method for coordinating network device transmissions, includes receiving multi-link operation (MLO)-related data from each of one or more MLO-enabled network devices associated with a coordination group, the coordination group including a plurality of network devices, allocating a transmission opportunity (TXOP) to a first network device in the coordination group based at least in part on the MLO-related data, and transmitting an indication of the allocation of the TXOP to the first network device.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

Figure 1:
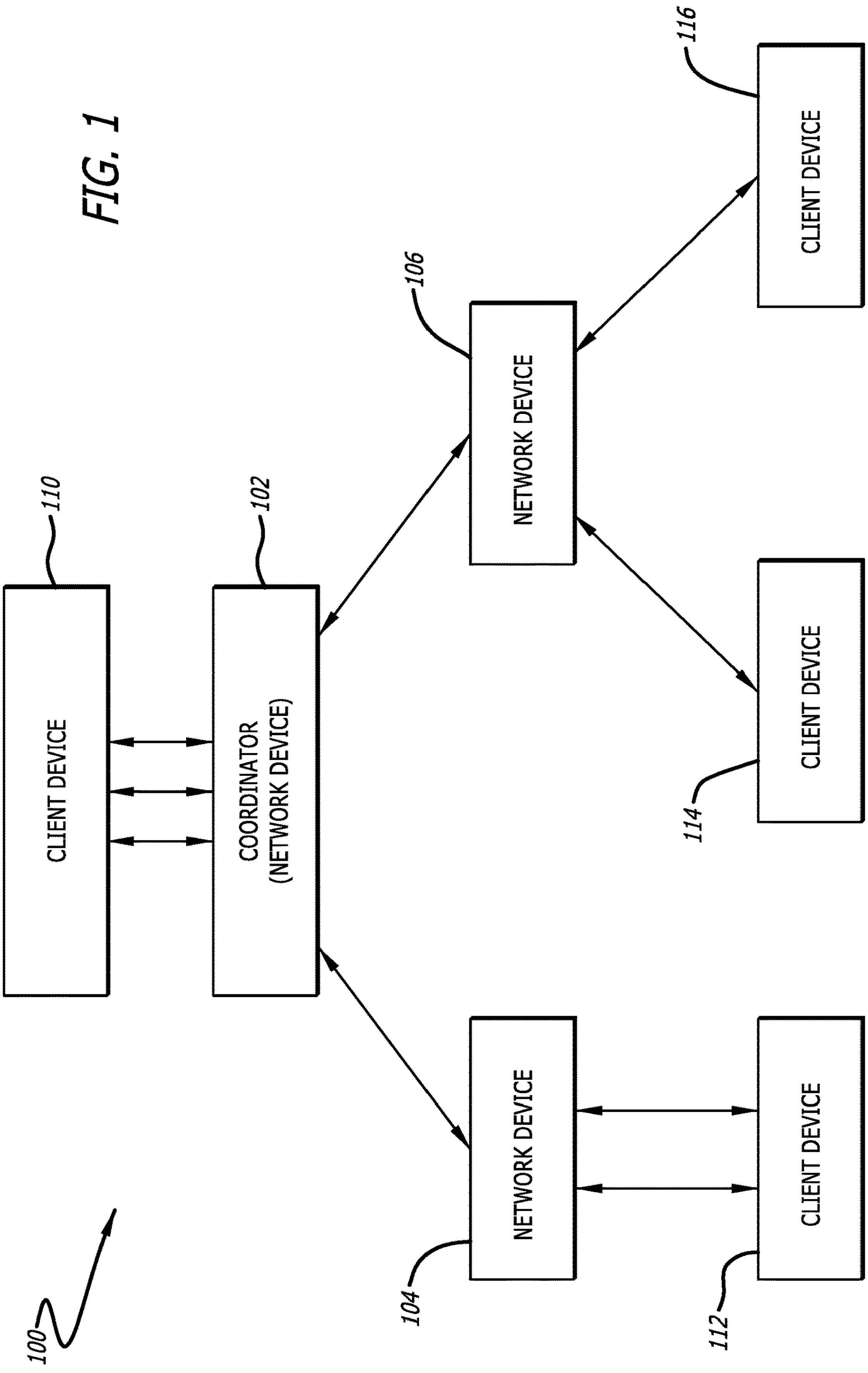
FIG. 1 is a diagram illustrating a wireless network with multi-access point (AP) coordination (MAPC) and multi-link device (MLD) features in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that coordinate transmission opportunities (TXOPs) in a wireless network, particularly focusing on multi-access point (AP) coordination (MAPC) and multi-link device (MLD) features. In many embodiments, an MAPC coordinator (also referred to as an MAPC scheduler) in a wireless network may coordinate TXOPs for multiple network devices (e.g., APs) in a coordination group. At least some of the network devices in the coordination group may utilize multi-link operation (MLO). When a network device and a client device (e.g., a station) both support MLO, the network device and the client device may establish and maintain multiple simultaneous links between each other over the same or different frequency bands. Hereinafter a network device that supports MLO may be referred to as an MLD network device or an MLO-enabled network device, and a client device that supports MLO may be referred to as an MLD client device. In general, a basic service set (BSS) can refer to a group of devices that communicate with each other within a network area, typically through a single network device. Where an MLD network device operates over multiple channels for MLO, each channel may be associated with a respective BSS. In a number of embodiments, the MAPC coordinator can receive data about the MLD status and buffer status of each BSS and/or each network device in the network. Based on the received data, the MAPC coordinator may make decisions about which MLD links are likely to be utilized and their associated TXOPs. Hereinafter the data about the MLD status and buffer status may be referred to, collectively, as MLO or MLO-related data. In a variety of embodiments, the MAPC coordinator may be implemented or co-located at one of the network devices in the coordination group. In some embodiments, the MAPC coordinator may be implemented separately from the network devices in the coordination group.

In more embodiments, the MLO-related data may include the number of MLD radios in each MLD network device. In additional embodiments, the MLO-related data can include indications of the supported MLO modalities of each MLD client device in association with an MLO network device in the coordination group. Examples of the supported MLO modalities may include, but are not limited to, simultaneous transmit and receive (STR), non-simultaneous transmit and receive (NSTR), or enhanced multi-link single-radio (eMLSR). In further embodiments, the MLO-related data may include the downlink (DL) buffer status of the network devices and/or the uplink (UL) buffer status of the client devices. In still more embodiments, each network device and each client device can report MLO-related data to the MAPC coordinator in real time. In still further embodiments, network devices and/or client devices may report aggregate or limited MLO-related data to the MAPC coordinator.

In still additional embodiments, the MAPC coordinator may consider the number of radios available at a network device relative to the number of radios available at other network devices in the coordination group when making TXOP allocations. For example, the MAPC coordinator can reduce the relative weights for APs having multiple MLD radios (e.g., tri-band APs each having 3 radios and serving 3 BSSs) because these APs having multiple MLD radios may have multiple times of TXOPs overall compared to non-MLD network devices (an MLD network device serving multiple BSSs can receive TXOP allocations independently for each of the BSSs served). Accordingly, in these embodiments, no client device-specific data may be provided to the MAPC coordinator.

In some more embodiments, the MAPC coordinator can examine (on a per-TXOP basis, that is, for each TXOP allocation) the DL demand (e.g., in terms of the amount of data) of each MLD network device and each affiliated BSS, and may rebalances the priority of at least some network devices according to their MLD DL demand. In certain embodiments, the DL demand may include the respective queue depth of medium access control (MAC) service data units (MSDUs) for each traffic identifier (TID)/access category (AC). For DL demand at the MLD network device level, the demand can be uncommitted (uncommitted demand may refer to demand that has yet to be scheduled for transmission). On the other hand, for DL demand at the BSS (link) level, the demand may be committed (committed demand may refer to demand that has been scheduled for transmission). In yet more embodiments, to rebalance the priority of the network devices, the MAPC coordinator can consider the DL demand for the same TID from other network devices (e.g., non-MLD network devices) that share a channel with the MLD network device. In general, the TID may be a field in the quality of service (QOS) control field of the MAC header in a wireless frame. A TID may be associated with each MSDU on a frame-by-frame basis. When an MSDU is encapsulated into a frame for transmission, it can be assigned a TID based on the type or category of the data it contains. The TID then may determine how the frame (and thus the MSDU) is handled by the network, including its priority level and how it is scheduled for transmission. Accordingly, by way of a non-limiting example, if there is an MLD network device and a non-MLD network device in the coordination group, and both network devices have DL demand associated with a same TID, where the DL demand at the MLD network device is committed demand that is initially assigned to the link whose channel is shared by the two network devices, the MAPC coordinator may prioritize the DL demand at the non-MLD network device over the DL demand at the MLD network device when allocating TXOPs because the MLD network device has the option of sending the DL data over a different link over a channel not utilized by the non-MLD network device. Accordingly, in these embodiments, no client device-specific data may be provided to the MAPC coordinator.

In still yet more embodiments, the MAPC coordinator may request (on a per-TXOP basis, that is, for each TXOP allocation) aggregate UL demand (e.g., in terms of the amount of data) data from the network devices in the coordination group. Each network device in the coordination group, in response, can send an aggregate buffer status report (BSR) including the aggregate UL demand data from the perspective of the network device to the MAPC coordinator. In many further embodiments, to determine the aggregate UL demand, the network device may sum (aggregate) the BSRs received from the client devices in association with the network device. Each BSR from a client device may include the UL demand data for the client device, which can include the respective queue depth of MSDUs for each TID/AC. For UL demand at the MLD client device level, the demand can be uncommitted. On the other hand, for UL demand at the BSS (link) level, the demand may be committed. In many additional embodiments, to receive a BSR message from a client device, a network device can transmit a buffer status report polling (BSRP) message to the client device. The client device may then transmit the BSR message to the network device in response to the received BSRP message. In still yet further embodiments, a BSR message transmitted by a client device can include data about the UL buffer of the client device. In still yet additional embodiments, based on the aggregate BSRs, the MAPC coordinator may allocate TXOPs to one or more client devices, where the client devices may be associated with various MLD network devices. In several embodiments, based on the aggregate BSRs, the MAPC coordinator may also assign resource units (RUs) to the one or more client devices. In general, the available channel bandwidth can be divided into smaller sub-channels, each of which may be referred to as an RU.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a “function,” “module,” “apparatus,” or “system.” Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom very large-scale integration (VLSI) circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a diagram illustrating a wireless network 100 with MAPC and MLD features in accordance with various embodiments of the disclosure is shown. In the embodiments shown in FIG. 1, the wireless network 100 may include three network devices 102, 104, and 106. In many embodiments, the network device 102 can serve a dual role as both a network device and an MAPC coordinator. The MAPC coordinator may be responsible for coordinating TXOPs across the network 100.

In a number of embodiments, network devices 102 and 104 may be MLD network devices, capable of establishing multiple simultaneous links with client devices. Specifically, as shown, the network device 102 can establish three links with the client device 110, allowing for increased throughput and reduced latency. Similarly, the network device 104 may establish two links with the client device 112, enhancing the network performance for the client device 112. On the other hand, the network device 106 can be a non-MLD network device, establishing a single link with each of client devices 114 and 116.

Although a specific embodiment for a wireless network with MAPC and MLD features suitable for carrying out the various steps, processes, methods, and operations described herein is discussed with respect to FIG. 1, any of a variety of systems and/or processes may be utilized in accordance with embodiments of the disclosure. For example, the MAPC coordinator can be a separate device within the network, rather than being co-located with a network device. The elements depicted in FIG. 1 may also be interchangeable with other elements of FIGS. 2-8 as required to realize a particularly desired embodiment.

Figure 2:
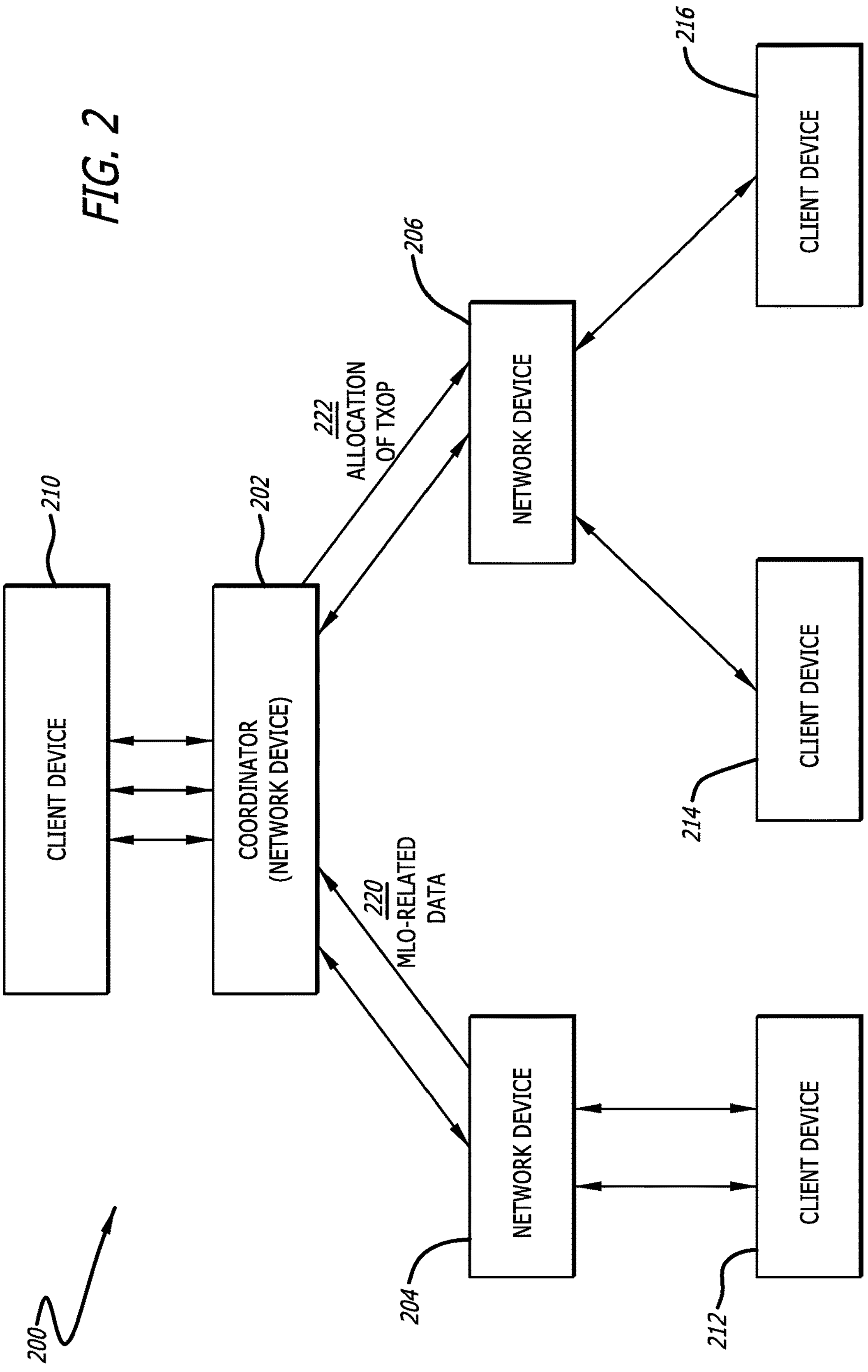
FIG. 2 is a diagram illustrating the exchange of multi-link operation (MLO)-related data and the allocation of transmission opportunities (TXOPs) in a wireless network in accordance with various embodiments of the disclosure.

Referring to FIG. 2, a diagram 200 illustrating the exchange of MLO-related data and the allocation of TXOPs in a wireless network in accordance with various embodiments of the disclosure is shown. In the embodiments depicted in FIG. 2, the wireless network may include network devices 202, 204, and 206, and client devices 210, 212, 214, and 216. These elements can be similar to network devices 102, 104, and 106, and client devices 110, 112, 114, and 116, respectively, as shown in the embodiments depicted in FIG. 1.

In a variety of embodiments, the network device 204, which is an MLD network device, may send MLO-related data 220 to the MAPC coordinator portion of the network device 202. In some embodiments, the MLO-related data may include the number of MLD radios in the network device 204. In more embodiments, the MLO-related data can include indications of the supported MLO modalities of each MLD client device in association with the network device 204, that is, the supported MLO modalities of the client device 212. Examples of the supported MLO modalities may include, but are not limited to, STR, NSTR, or eMLSR. In additional embodiments, the MLO-related data may include the DL buffer status of the network device 204 and/or the UL buffer status of the client device 212. In further embodiments, the network device 204 may send the DL buffer status and/or the UL buffer status to the MAPC coordinator portion of the network device 202 in response to a request from the MAPC coordinator portion of the network device 202. Similarly, the network device portion of the network device 202, which is also an MLD network device, can also provide MLO-related data to the MAPC coordinator portion of the same device.

Upon receiving the MLO-related data, the MAPC coordinator portion of the network device 202 may make decisions about the allocation of TXOPs in the network. In still more embodiments, the MAPC coordinator portion of the network device 202 may consider the number of radios available at a network device (e.g., at the MLD network device 204 and/or the MLD network device portion of the network device 202) relative to the number of radios available at other network devices (e.g., at the non-MLD network device 206) in the coordination group when making TXOP allocations. For example, the MAPC coordinator portion of the network device 202 can reduce the relative weights for network devices having multiple MLD radios because these network devices having multiple MLD radios may have multiple times of TXOPs overall compared to non-MLD network devices (an MLD network device serving multiple BSSs can receive TXOP allocations independently for each of the BSSs served). In still further embodiments, the MAPC coordinator portion of the network device 202 can reduce the relative weights for network devices having greater than a threshold number (e.g., 1, 2, 3, 4, . . . , etc.) of MLD radios.

In still additional embodiments, the MAPC coordinator portion of the network device 202 can examine (on a per-TXOP basis, that is, for each TXOP allocation) the DL demand (e.g., in terms of the amount of data) of each MLD network device (e.g., the MLD network device 204 and the network device portion of the network device 202) and each affiliated BSS, and may rebalances the priority of at least some network devices according to their MLD DL demand. In some more embodiments, the DL demand may include the respective queue depth of MSDUs for each TID/AC. In certain embodiments, to rebalance the priority of the network devices, the MAPC coordinator can consider the DL demand for the same TID from other network devices (e.g., the non-MLD network device 206) that shares a channel with an MLD network device (e.g., the MLD network device 204 or the network device portion of the network device 202). By way of a non-limiting example, if both the network device 204 and the network device 206 have DL demand associated with a same TID, where the DL demand at the MLD network device 204 is committed demand that is initially assigned to the link whose channel is shared by the two network devices, the MAPC coordinator portion of the network device 202 may prioritize the DL demand at the non-MLD network device 206 over the DL demand at the MLD network device 204 when allocating TXOPs because the MLD network device 204 has the option of sending the DL data over a different link over a channel not utilized by the non-MLD network device 206. Accordingly, in yet more embodiments, as shown, the MAPC coordinator portion of the network device 202 can indicate, to the non-MLD network device 206, an allocation of TXOP 222. This may allow the network device 206 to make a DL transmission based on the allocation of TXOP 222.

In still yet more embodiments, each of the network device portion of the network device 202, the network device 204, or the network device 206 can send an aggregate BSR relating to the UL buffer status of client device(s) associated with the respective network device to the MAPC coordinator portion of the network device 202. Embodiments relating to the determination and transmission of aggregate BSRs may be described in further detail below with reference to FIG. 3. In many further embodiments, based on the aggregate BSRs, the MAPC coordinator portion of the network device 202 may allocate TXOPs to one or more client devices (e.g., one or more of the client devices 210, 212, 214, or 216). In many additional embodiments, based on the aggregate BSRs, the MAPC coordinator portion of the network device 202 may also assign RUs to the one or more client devices (e.g., one or more of the client devices 210, 212, 214, or 216). In still yet further embodiments, the MAPC coordinator portion of the network device 202 may signal the allocation of the UL TXOP/RU to the network device that is in association with the client device that is receiving the allocation of the UL TXOP/RU. In still yet additional embodiments, the network device may, based on the received indication, indicate the allocation of the UL TXOP/RU to the relevant client devices. In particular, the network device can schedule UL transmissions for the client devices based on the allocation of the UL TXOP/RU. The client devices can then make UL transmissions based on the allocation of the UL TXOP/RU.

Although a specific embodiment for the exchange of MLO-related data and the allocation of TXOPs in a wireless network suitable for carrying out the various steps, processes, methods, and operations described herein is discussed with respect to FIG. 2, any of a variety of systems and/or processes may be utilized in accordance with embodiments of the disclosure. For example, the MLO-related data may be sent periodically or in response to a request from the MAPC coordinator. The elements depicted in FIG. 2 may also be interchangeable with other elements of FIGS. 1 and 3-8 as required to realize a particularly desired embodiment.

Figure 3:
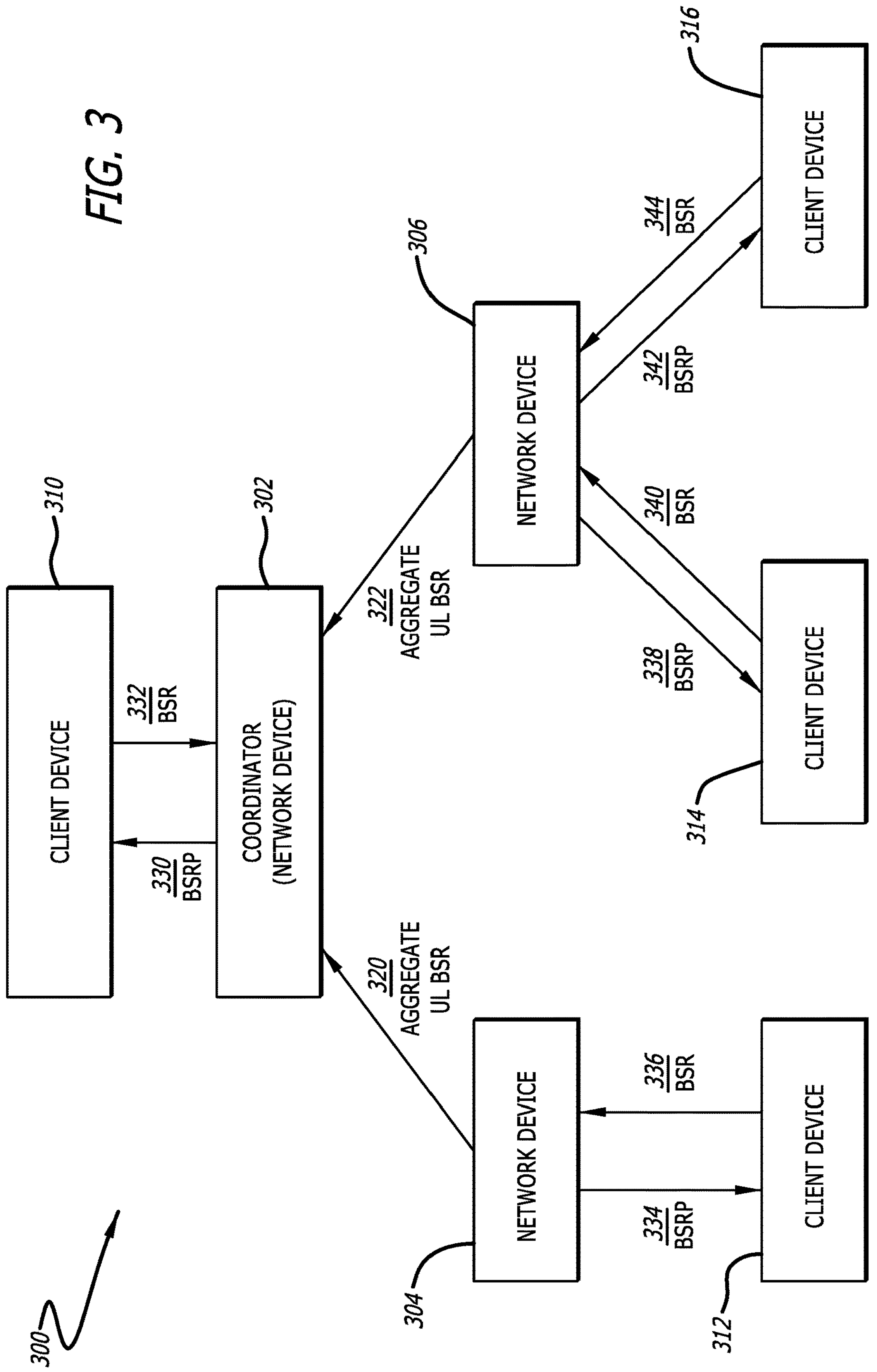
FIG. 3 is a diagram illustrating the exchange of buffer status report polling (BSRP) and buffer status report (BSR) messages in a wireless network in accordance with various embodiments of the disclosure.

Referring to FIG. 3, a diagram 300 illustrating the exchange of BSRP and BSR messages in a wireless network in accordance with various embodiments of the disclosure is shown. In the embodiments depicted in FIG. 3, the wireless network may include network devices 302, 304, and 306, and client devices 310, 312, 314, and 316. These elements can be similar to the network devices 102, 104, and 106, and client devices 110, 112, 114, and 116, respectively, as shown in the embodiments depicted in FIG. 1.

In many embodiments, the network device portion of the network device 302 may send a BSRP message 330 to the client device 310, and can receive a BSR message 332 in return. Similarly, the network device 304 may send a BSRP message 334 to the client device 312, and can receive a BSR message 336 in return. The non-MLD network device 306 may send a BSRP message 338 to the client device 314, and can receive a BSR message 340 in return. The network device 306 may further send a BSRP message 342 to the client device 316, and can receive a BSR message 344 in return. In a number of embodiments, a BSR message from a client device (e.g., any of the client devices 310, 312, 314, or 316) may include data about the buffer status of the client device and/or each link of the client device, which can include the UL demand at the client device and/or each link of the client device. The BSR message can also include other relevant parameters.

In a variety of embodiments, based on the received BSR message 336, the network device 304 may generate an aggregate UL BSR 320, and may transmit the aggregate UL BSR 320 to the MAPC coordinator portion of network device 302. Similarly, based on the received BSR messages 340 and 344, the network device 306 can generate an aggregate UL BSR 322, and can transmit it to the MAPC coordinator portion of network device 302. Although not shown in the figure, the network device portion of the network device 302 can also provide an aggregate UL BSR based on the BSR message 332 to the MAPC coordinator portion of the same device. In some embodiments, a network device may generate an aggregate UL BSR by aggregating the individual BSRs into a single report. The aggregation process can involve various methods depending on the specific implementation. By way of a non-limiting example, a network device may sum up the buffer statuses of all associated client devices/links. In more embodiments, a network device can initiate the process of gathering BSRs and sending the aggregate UL BSR in response to a request from the MAPC coordinator (e.g., the MAPC coordinator portion of the network device 302). In additional embodiments, as having been described in detail above, the MAPC coordinator portion of the network device 302 may make decisions about allocating UL TXOPs/RUs to one or more client devices (e.g., one or more of the client devices 310, 312, 314, or 316) based on the aggregate UL BSRs received from the network devices.

Although a specific embodiment for the exchange of BSRP and BSR messages in a wireless network suitable for carrying out the various steps, processes, methods, and operations described herein is discussed with respect to FIG. 3, any of a variety of systems and/or processes may be utilized in accordance with embodiments of the disclosure. For example, the aggregate UL BSRs can be sent periodically or in response to a request from the MAPC coordinator. The elements depicted in FIG. 3 may also be interchangeable with other elements of FIGS. 1, 2, and 4-8 as required to realize a particularly desired embodiment.

Figure 4:
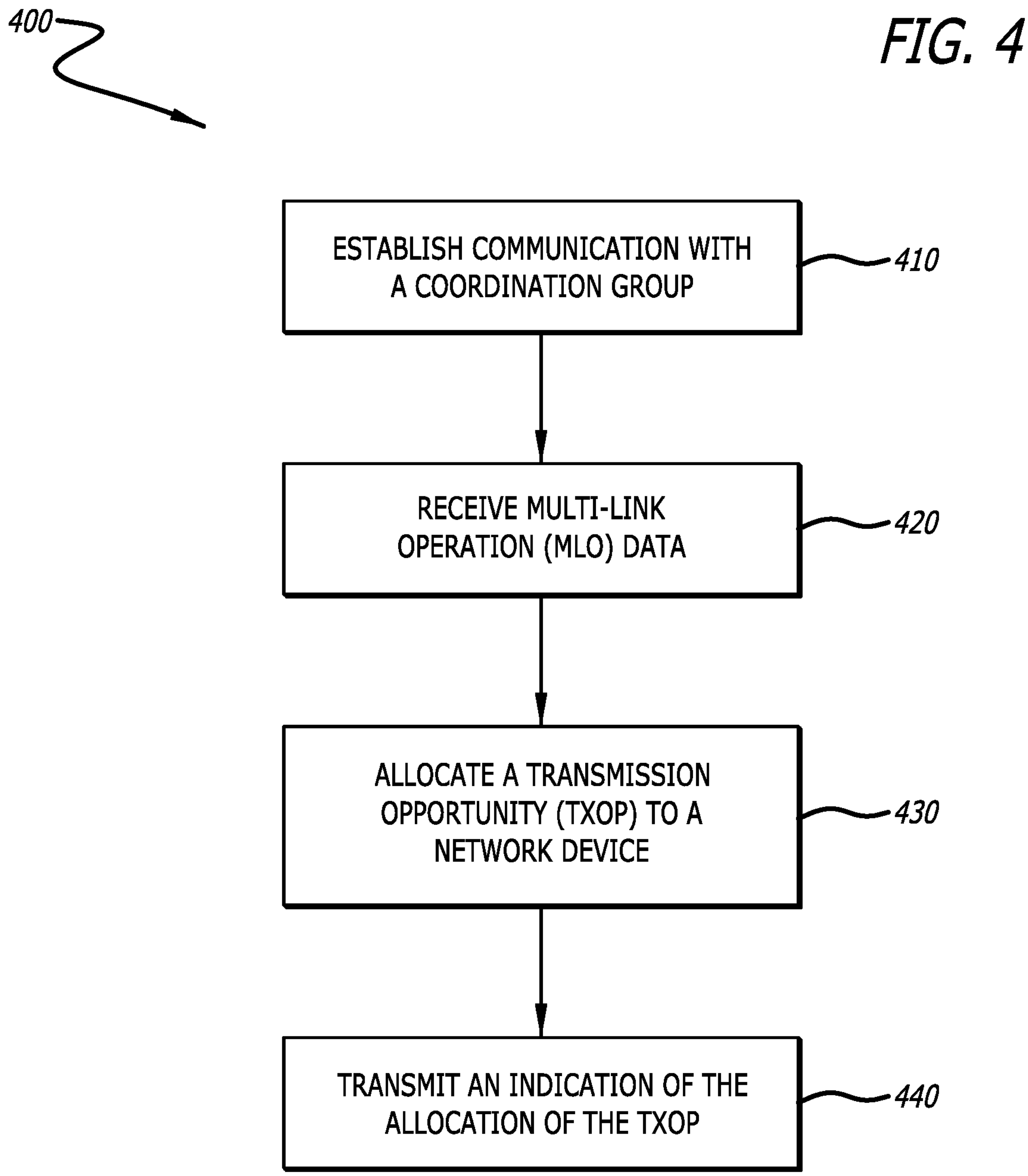
FIG. 4 is a flowchart showing a process for managing TXOPs in a wireless network with MLO capabilities in accordance with various embodiments of the disclosure.

Referring to FIG. 4, a flowchart showing a process 400 for managing TXOPs in a wireless network with MLO capabilities in accordance with various embodiments of the disclosure is shown. In many embodiments, the process 400 may establish communication with a coordination group (block 410). The coordination group can include multiple network devices, some of which may be MLO-enabled. The establishment of communication may involve the exchange of control messages, data packets, or other types of network traffic.

In a number of embodiments, the process 400 may receive MLO-related data (block 420). The MLO-related data can be received from each of one or more MLO-enabled network devices associated with the coordination group. In a variety of embodiments, the MLO-related data can relate to the MLO status and buffer status of each network device, which can be utilized by an MAPC coordinator to optimize the allocation of TXOPs in the network.

In some embodiments, the process 400 may allocate a TXOP to a network device in the coordination group (block 430). The allocation of the TXOP can be based at least in part on the MLO-related data. The allocation may be based on further on various other factors, such as, but not limited to, the current network conditions, the specifications of the client devices, and other relevant parameters.

In more embodiments, the process 400 may transmit an indication of the allocation of the TXOP (block 440). The indication of the allocation of the TXOP can be transmitted to the network device by the MAPC coordinator. The indication may allow the network device to schedule its DL transmissions accordingly.

Although a specific embodiment for managing TXOPs in a wireless network with MLO capabilities suitable for carrying out the various steps, processes, methods, and operations described herein is discussed with respect to FIG. 4, any of a variety of systems and/or processes may be utilized in accordance with embodiments of the disclosure. For example, the process can also involve the collection of additional data, such as, but not limited to, the QoS specifications of the client devices, the current network load, or the available network resources. The elements depicted in FIG. 4 may also be interchangeable with other elements of FIGS. 1-3 and 5-8 as required to realize a particularly desired embodiment.

Figure 5:
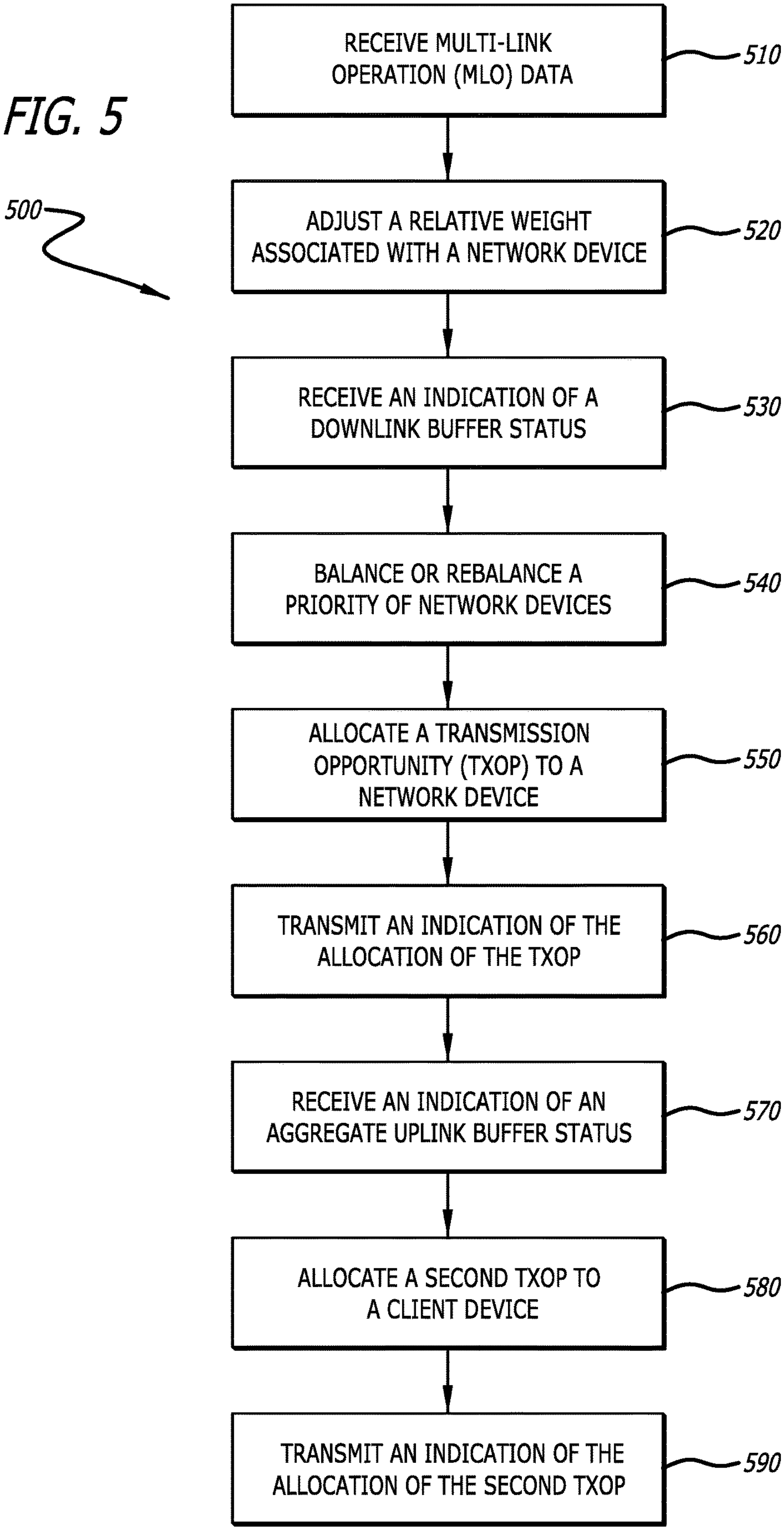
FIG. 5 is a flowchart showing a process for managing TXOPs in a wireless network with MLO capabilities in accordance with various embodiments of the disclosure.

Referring to FIG. 5, a flowchart showing a process 500 for managing TXOPs in a wireless network with MLO capabilities in accordance with various embodiments of the disclosure is shown. In many embodiments, the process 500 may receive MLO-related data (block 510). The MLO-related data can be received from each of one or more MLO-enabled network devices associated with a coordination group. The data may relate to the MLO status and buffer status of each network device, which can be utilized to optimize the allocation of TXOPs in the network.

In a number of embodiments, the process 500 may adjust a relative weight associated with a network device (block 520). In a variety of embodiments, the MAPC coordinator may reduce a relative weight associated with a MLO-enabled network device. The adjustment can be based on various factors, such as, but not limited to, the number of radios for each of the MLO-enabled network devices or the current network conditions.

In some embodiments, the process 500 may receive an indication of a DL buffer status (block 530). The DL buffer status can be associated with each network device in the coordination group. In more embodiments, the DL buffer status may include a DL queue depth associated with each TID and each BSS at each of the MLO-enabled network devices.

In additional embodiments, the process 500 may balance or rebalance a priority of network devices in the coordination group (block 540). The balancing or rebalancing can be based on various factors, such as, but not limited to, the DL buffer status or other relevant parameters. By way of a non-limiting example, a network device with a greater DL demand or having fewer available links may be given a higher priority.

In further embodiments, the process 500 may allocate a TXOP to a network device in the coordination group (block 550). The allocation of the TXOP can be based at least in part on the MLO-related data. In still more embodiments, the allocation may be based at least in part on the adjusted relative weights and/or the balanced or rebalanced priorities of the network devices.

In still further embodiments, the process 500 may transmit an indication of the allocation of the TXOP (block 560). The indication of the allocation of the TXOP can be transmitted to the network device by the MAPC coordinator. The indication can inform the network device about its allocated TXOP, allowing the network device to schedule its DL transmissions accordingly.

In still additional embodiments, the process 500 may receive an indication of an aggregate UL buffer status (block 570). The aggregate UL buffer status can be a respective aggregate UL buffer status associated with each network device in the coordination group. The aggregate UL buffer status may be based on aggregating BSRs from client devices associated with the network device.

In some more embodiments, the process 500 may allocate a second TXOP to a client device (block 580). The client device can be associated with a second network device in the coordination group. The allocation of the second TXOP may be based on the aggregate UL buffer status or other relevant parameters. In certain embodiments, the allocation of the second TXOP can be associated with an assignment of one or more RUs.

In yet more embodiments, the process 500 may transmit an indication of the allocation of the second TXOP (block 590). The indication can be transmitted to the second network device by the MAPC coordinator. The second network device may, based on the received indication, indicate the allocation of the second TXOP to the client device. In particular, the second network device may schedule a UL transmission for the client device based on the allocation of the second TXOP. The client device can then send its UL transmissions accordingly.

Although a specific embodiment for managing transmission opportunities in a wireless network with MLO capabilities suitable for carrying out the various steps, processes, methods, and operations described herein is discussed with respect to FIG. 5, any of a variety of systems and/or processes may be utilized in accordance with embodiments of the disclosure. For example, the process can also involve the use of machine learning processes to predict future buffer statuses, thereby enabling proactive allocation of TXOPs. The elements depicted in FIG. 5 may also be interchangeable with other elements of FIGS. 1-4 and 6-8 as required to realize a particularly desired embodiment.

Figure 6:
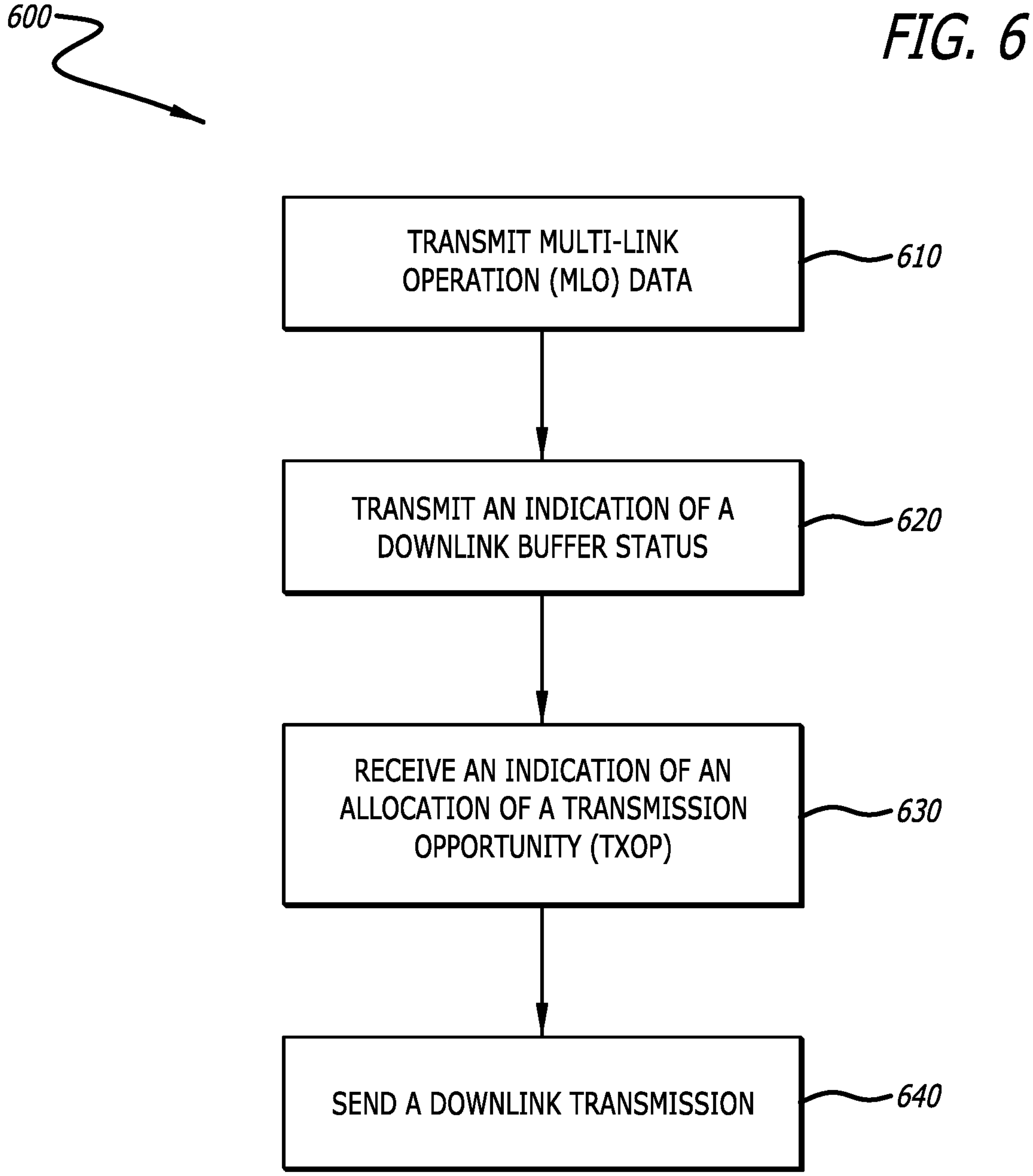
FIG. 6 is a flowchart showing a process for managing TXOPs in a wireless network from the perspective of a network device in accordance with various embodiments of the disclosure.

Referring to FIG. 6, a flowchart showing a process 600 for managing TXOPs in a wireless network from the perspective of a network device in accordance with various embodiments of the disclosure is shown. In many embodiments, the process 600 may transmit MLO-related data (block 610). The MLO-related data can be associated with the network device, and can be transmitted to a coordinator network device associated with a coordination group. The MLO-related data may relate to the MLO status and buffer status of the network device, which can be utilized by the coordinator network device to optimize the allocation of TXOPs in the network.

In a number of embodiments, the process 600 may transmit an indication of a DL buffer status (block 620). The DL buffer status can be associated with the network device, and can be transmitted to the coordinator network device. The DL buffer status may include a DL queue depth associated with each TID and each BSS at the network device.

In a variety of embodiments, the process 600 may receive an indication of an allocation of a TXOP (block 630). The indication of the TXOP can be received from the coordinator network device, and can be based at least in part on the MLO-related data. The indication may inform the network device about its allocated TXOP, allowing the network device to schedule its DL transmissions accordingly.

In some embodiments, the process 600 may send a DL transmission (block 640). The DL transmission can be sent based on the allocation of the TXOP. The DL transmission may include data packets, control messages, or other types of network traffic, and can be sent to one or more client devices associated with the network device.

Although a specific embodiment for managing TXOPs in a wireless network from the perspective of a network device suitable for carrying out the various steps, processes, methods, and operations described herein is discussed with respect to FIG. 6, any of a variety of systems and/or processes may be utilized in accordance with embodiments of the disclosure. For example, the process may also involve the use of advanced signal processing techniques, such as, but not limited to, beamforming or multiple-input multiple-output (MIMO) technology, to enhance the quality of the DL transmissions based on the allocated TXOP. The elements depicted in FIG. 6 may also be interchangeable with other elements of FIGS. 1-5, 7, and 8 as required to realize a particularly desired embodiment.

Figure 7:
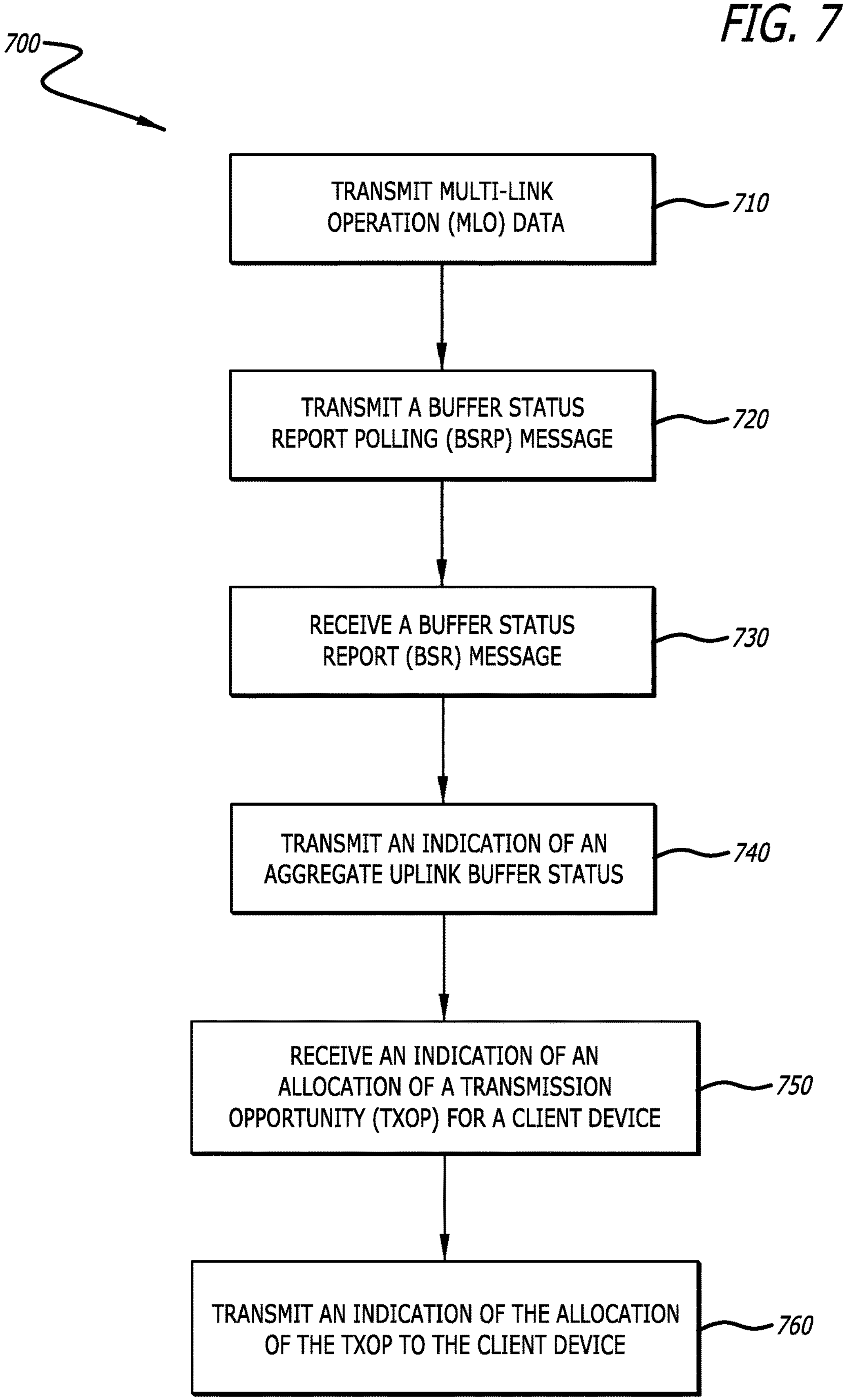
FIG. 7 is a flowchart showing a process for managing TXOPs in a wireless network from the perspective of a network device with client device considerations in accordance with various embodiments of the disclosure.

Referring to FIG. 7, a flowchart showing a process 700 for managing TXOPs in a wireless network from the perspective of a network device with client device considerations in accordance with various embodiments of the disclosure is shown. In many embodiments, the process 700 may transmit MLO-related data (block 710). The MLO-related data can be associated with the network device, and can be transmitted to a coordinator network device associated with a coordination group. The MLO-related data may relate to the MLO status and buffer status of the network device, which can be utilized by the coordinator network device to optimize the allocation of TXOPs in the network.

In a number of embodiments, the process 700 may transmit a BSRP message (block 720). The BSRP message can be transmitted to each client device associated with the network device. The BSRP message may request each client device to provide a BSR, which can relate to the buffer status of the client device.

In a variety of embodiments, the process 700 may receive a BSR message (block 730). The BSR message can include a respective BSR message from each of at least some client devices associated with the network device. The BSR messages may provide the network device with up-to-date data about the buffer status of the client devices, which can be utilized by the coordinator network device to manage the network resources more effectively.

In some embodiments, the process 700 may transmit an indication of an aggregate UL buffer status (block 740). The aggregate UL buffer status can be associated with the network device, and can be transmitted to the coordinator network device. The aggregate UL buffer status may be based on the BSR messages received from the client devices, and can provide a comprehensive view of the buffer statuses of the client devices in association with the network device.

In more embodiments, the process 700 may receive an indication of an allocation of a second TXOP for a client device (block 750). The indication of the allocation of the second TXOP can be received from the coordinator network device. The indication may inform the network device about the allocated second TXOP for its associated client device, allowing the network device to schedule the UL transmissions for the client device accordingly.

In additional embodiments, the process 700 may transmit an indication of the allocation of the second TXOP to the client device (block 760). The indication can inform the client device about its allocated second TXOP. In further embodiments, the network device may schedule the UL transmission for the client device based on the allocation of the second TXOP. The client device can then send its UL transmission accordingly.

Although a specific embodiment for managing transmission opportunities in a wireless network from the perspective of a network device with client device considerations suitable for carrying out the various steps, processes, methods, and operations described herein is discussed with respect to FIG. 7, any of a variety of systems and/or processes may be utilized in accordance with embodiments of the disclosure. For example, the process may also involve the use of predictive analytics to anticipate the future buffer status of the client devices, thereby enabling the network device to proactively request TXOP allocations from the coordinator network device. The elements depicted in FIG. 7 may also be interchangeable with other elements of FIGS. 1-6 and 8 as required to realize a particularly desired embodiment.

Figure 8:
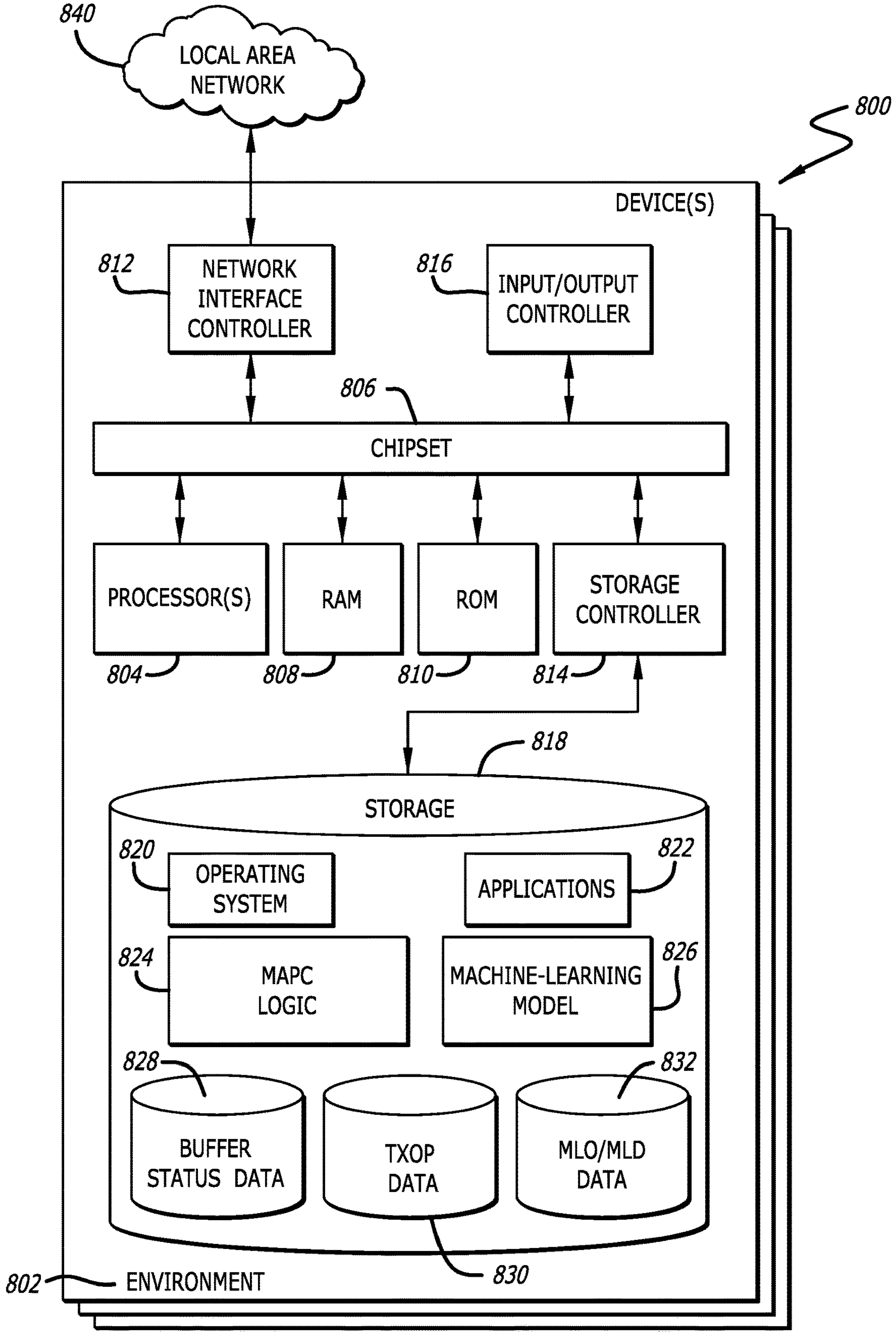
FIG. 8 is a conceptual block diagram for one or more devices capable of executing components and logic for implementing the functionality and embodiments described above.

Referring to FIG. 8, a conceptual block diagram for one or more devices 800 capable of executing components and logic for implementing the functionality and embodiments described above is shown. The embodiment of the conceptual block diagram depicted in FIG. 8 can illustrate a conventional server computer, workstation, desktop computer, laptop, tablet, network appliance, e-reader, smartphone, or other computing device, and can be utilized to execute any of the application and/or logic components presented herein. The device 800 may, in some examples, correspond to physical devices or to virtual resources described herein.

In many embodiments, the device 800 may include an environment 802 such as a baseboard or "motherboard," in physical embodiments that can be configured as a printed circuit board with a multitude of components or devices connected by way of a system bus or other electrical communication paths. Conceptually, in virtualized embodiments, the environment 802 may be a virtual environment that encompasses and executes the remaining components and resources of the device 800. In more embodiments, one or more processors 804, such as, but not limited to, central processing units ("CPUs") can be configured to operate in conjunction with a chipset 806. The processor(s) 804 can be standard programmable CPUs that perform arithmetic and logical operations necessary for the operation of the device 800.

In additional embodiments, the processor(s) 804 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In certain embodiments, the chipset 806 may provide an interface between the processor(s) 804 and the remainder of the components and devices within the environment 802. The chipset 806 can provide an interface to a random-access memory ("RAM") 808, which can be used as the main memory in the device 800 in some embodiments. The chipset 806 can further be configured to provide an interface to a computer-readable storage medium such as a read-only memory ("ROM") 810 or non-volatile RAM ("NVRAM") for storing basic routines that can help with various tasks such as, but not limited to, starting up the device 800 and/or transferring information between the various components and devices. The ROM 810 or NVRAM can also store other application components necessary for the operation of the device 800 in accordance with various embodiments described herein.

Different embodiments of the device 800 can be configured to operate in a networked environment using logical connections to remote computing devices and computer systems through a network, such as the network 840. The chipset 806 can include functionality for providing network connectivity through a network interface card ("NIC") 812, which may comprise a gigabit Ethernet adapter or similar component. The NIC 812 can be capable of connecting the device 800 to other devices over the network 840. It is contemplated that multiple NICs 812 may be present in the device 800, connecting the device to other types of networks and remote systems.

In further embodiments, the device 800 can be connected to a storage 818 that provides non-volatile storage for data accessible by the device 800. The storage 818 can, for example, store an operating system 820, applications 822, buffer status data 828, TXOP data 830, and MLO/MLD data 832, which are described in greater detail below. The storage 818 can be connected to the environment 802 through a storage controller 814 connected to the chipset 806. In certain embodiments, the storage 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The device 800 can store data within the storage 818 by transforming the physical state of the physical storage units to reflect the information being stored. The specific transformation of physical state can depend on various factors. Examples of such factors can include, but are not limited to, the technology used to implement the physical storage units, whether the storage 818 is characterized as primary or secondary storage, and the like.

For example, the device 800 can store information within the storage 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 800 can further read or access information from the storage 818 by detecting the physical states or characteristics of one or more particular locations within the physical storage units.

In addition to the storage 818 described above, the device 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 800. In some examples, the operations performed by a cloud computing network, and or any components included therein, may be supported by one or more devices similar to device 800. Stated otherwise, some or all of the operations performed by the cloud computing network, and or any components included therein, may be performed by one or more devices 800 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 818 can store an operating system 820 utilized to control the operation of the device 800. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 818 can store other system or application programs and data utilized by the device 800.

In various embodiment, the storage 818 or other computer-readable storage media is encoded with computer-executable instructions which, when loaded into the device 800, may transform it from a general-purpose computing system into a special-purpose computer capable of implementing the embodiments described herein. These computer-executable instructions may be stored as application 822 and transform the device 800 by specifying how the processor(s) 804 can transition between states, as described above. In some embodiments, the device 800 has access to computer-readable storage media storing computer-executable instructions which, when executed by the device 800, perform the various processes described above with regard to FIGS. 1-7. In more embodiments, the device 800 can also include computer-readable storage media having instructions stored thereupon for performing any of the other computer-implemented operations described herein.

In still further embodiments, the device 800 can also include one or more input/output controllers 816 for receiving and processing input from a number of input devices, such as a keyboard, a mouse, a touchpad, a touch screen, an electronic stylus, or other type of input device. Similarly, an input/output controller 816 can be configured to provide output to a display, such as a computer monitor, a flat panel display, a digital projector, a printer, or other type of output device. Those skilled in the art will recognize that the device 800 might not include all of the components shown in FIG. 8, and can include other components that are not explicitly shown in FIG. 8, or might utilize an architecture completely different than that shown in FIG. 8.

As described above, the device 800 may support a virtualization layer, such as one or more virtual resources executing on the device 800. In some examples, the virtualization layer may be supported by a hypervisor that provides one or more virtual machines running on the device 800 to perform functions described herein. The virtualization layer may generally support a virtual resource that performs at least a portion of the techniques described herein.

In many embodiments, the device 800 can include a MAPC logic 824. The MAPC logic 824 can manage and control the allocation and prioritization of TXOPs in a wireless network with MLO capabilities. The MAPC logic 824 may utilize various data inputs such as, but not limited to, MLO-related data and buffer status data to optimize the distribution of TXOPs among network devices, ensuring efficient utilization of network resources and improved network performance.

In a number of embodiments, the storage 818 can include buffer status data 828. The buffer status data 828 may relate to the current status of the data buffer in a network device or a client device. The buffer status data 828 can typically include details such as, but not limited to, the amount of data currently stored in the buffer, which can be used to manage and optimize data transmission in a wireless network.

In various embodiments, the storage 818 can include TXOP data 830. The TXOP data 830 may relate to the allocated TXOPs for a network device or a client device in a wireless network. The TXOP data 830 can typically include details such as, but not limited to, the start time, duration, and frequency band or channel of the TXOP, which can be used by the network device to schedule data transmissions accordingly.

In still more embodiments, the storage 818 can include MLO/MLD data 832. The MLO/MLD data 832 may relate to the MLO capabilities and status of a network device or a client device in a wireless network. The MLO/MLD data 832 can typically include details such as, but not limited to, the number of radios, the types of links, the supported operation modes/modalities, and/or the current operation mode, which can be used to manage and optimize data transmission in a network with MLO capabilities.

Finally, in many embodiments, data may be processed into a format usable by a machine-learning model 826 (e.g., feature vectors), and or other pre-processing techniques. The machine-learning ("ML") model 826 may be any type of ML model, such as supervised models, reinforcement models, and/or unsupervised models. The ML model 826 may include one or more of linear regression models, logistic regression models, decision trees, Naïve Bayes models, neural networks, k-means cluster models, random forest models, and/or other types of ML models 826. The ML model 826 may be configured to analyze and predict network conditions, buffer status, and MLO-related data, thereby enabling more efficient and proactive allocation and prioritization of TXOPs in a wireless network with MLO capabilities.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A coordinator network device, comprising:
- a processor;
- at least one network interface controller configured to provide access to a network; and
- a memory communicatively coupled to the processor, wherein the memory comprises a coordination logic that is configured to:
  - receive multi-link operation (MLO)-related data from each of one or more MLO-enabled network devices associated with a coordination group, the coordination group comprising a plurality of network devices;
  - allocate a transmission opportunity (TXOP) to a first network device in the coordination group based at least in part on the MLO-related data;
  - transmit an indication of the allocation of the TXOP to the first network device, wherein the TXOP is allocated to the first network device based on a number of radios for each of the at least one of the one or more MLO-enabled network devices; and
  - reduce a relative weight associated with a first MLO-enabled network device of the one or more MLO-enabled network devices in response to the first MLO-enabled network device having a greater than a threshold number of radios.

2. The coordinator network device of claim 1, wherein the coordination group comprises a multi-access point (AP) coordination (MAPC) group.

3. The coordinator network device of claim 1, wherein the MLO-related data from at least one of the one or more MLO-enabled network devices comprises an indication of a number of radios for each of the at least one of the one or more MLO-enabled network devices.

4. The coordinator network device of claim 1, wherein the MLO-related data from at least one of the one or more MLO-enabled network devices comprises an indication of one or more supported MLO modalities for one or more client devices associated with each of the at least one of the one or more MLO-enabled network devices.

5. The coordinator network device of claim 4, wherein the one or more supported MLO modalities comprise one or more of simultaneous transmit and receive (STR), non-simultaneous transmit and receive (NSTR), or enhanced multi-link single-radio (eMLSR).

6. The coordinator network device of claim 1, wherein the MLO-related data is received from at least one of the one or more MLO-enabled network devices based on the at least one of the one or more MLO-enabled network devices joining the coordination group.

7. The coordinator network device of claim 1, wherein the TXOP is allocated to the first network device based at least further in part on a downlink buffer status associated with each network device of the plurality of network devices in the coordination group.

8. The coordinator network device of claim 7, wherein the downlink buffer status includes a downlink queue depth associated with each traffic identifier (TID) and each basic service set (BSS) at the network device.

9. The coordinator network device of claim 8, wherein the downlink queue depth corresponds to a number of medium access control (MAC) service data units (MSDUs).

10. The coordinator network device of claim 8, wherein the coordination logic is further configured to balance or rebalance a priority of at least some of the plurality of network devices.

11. The coordinator network device of claim 8, wherein the coordination logic is further configured to:

allocate a second TXOP to a client device associated with a second network device in the coordination group based at least in part on the MLO-related data and an aggregate uplink buffer status associated with each network device of the plurality of network devices in the coordination group; and transmit an indication of the allocation of the second TXOP to the second network device.

12. The coordinator network device of claim 11, wherein the aggregate uplink buffer status is based on a buffer status report (BSR) from each client device associated with the network device.

13. The coordinator network device of claim 12, wherein the BSR includes an uplink queue depth associated with each traffic identifier (TID) and each basic service set (BSS) at the client device.

14. The coordinator network device of claim 13, wherein the uplink queue depth corresponds to a number of medium access control (MAC) service data units (MSDUs).

15. The coordinator network device of claim 14, wherein the MSDUs include one or more committed MSDUs.

16. The coordinator network device of claim 11, wherein the allocation of the second TXOP is associated with a resource unit (RU) assignment.

17. A network device, comprising:

a processor;

at least one network interface controller configured to provide access to a network; and a memory communicatively coupled to the processor, wherein the memory comprises a coordination logic that is configured to:

transmit multi-link operation (MLO)-related data associated with the network device to a coordinator network device associated with a coordination group, the coordination group comprising a plurality of network devices, the plurality of network devices including the network device;

receive an indication of an allocation of a transmission opportunity (TXOP) from the coordinator network device based at least in part on the MLO-related data;

send a downlink transmission based on the allocation of the TXOP;

wherein the TXOP is allocated to the network device based on a number of radios for each of the at least one of the one or more MLO-enabled network devices; and reduce a relative weight associated with a first MLO-enabled network device of the one or more MLO-enabled network devices in response to the first MLO-enabled network device having a greater than a threshold number of radios.

18. A method for coordinating network device transmissions, comprising:

receiving multi-link operation (MLO)-related data from each of one or more MLO-enabled network devices associated with a coordination group, the coordination group comprising a plurality of network devices;

allocating a transmission opportunity (TXOP) to a first network device in the coordination group based at least in part on the MLO-related data;

transmitting an indication of the allocation of the TXOP to the first network device;

wherein the TXOP is allocated to the first network device based on a number of radios for each of the at least one of the one or more MLO-enabled network devices; and reducing a relative weight associated with a first MLO-enabled network device of the one or more MLO-enabled network devices in response to the first MLO-enabled network device having a greater than a threshold number of radios.

* * * * *